US010028132B2

(12) United States Patent
Choi et al.

(10) Patent No.: US 10,028,132 B2
(45) Date of Patent: Jul. 17, 2018

(54) METHOD FOR TRANSCEIVING SYSTEM INFORMATION IN CLOUD WIRELESS COMMUNICATION SYSTEM AND APPARATUS THEREFOR

(71) Applicant: LG ELECTRONICS INC., Seoul (KR)

(72) Inventors: Hyeyoung Choi, Seoul (KR); Jaehoon Chung, Seoul (KR); Eunjong Lee, Seoul (KR); Heejeong Cho, Seoul (KR); Genebeck Hahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 15/101,838

(22) PCT Filed: May 30, 2014

(86) PCT No.: PCT/KR2014/004844
§ 371 (c)(1),
(2) Date: Jun. 3, 2016

(87) PCT Pub. No.: WO2015/083911
PCT Pub. Date: Jun. 11, 2015

(65) Prior Publication Data
US 2017/0180982 A1  Jun. 22, 2017

Related U.S. Application Data

(60) Provisional application No. 61/911,479, filed on Dec. 4, 2013.

(51) Int. Cl.
H04W 76/11  (2018.01)
H04W 8/24  (2009.01)
H04W 76/02  (2009.01)

(52) U.S. Cl.
CPC ......... *H04W 8/245* (2013.01); *H04W 76/021* (2013.01); *H04W 76/11* (2018.02)

(58) Field of Classification Search
USPC .................................................. 370/235, 329
See application file for complete search history.

(56) References Cited

U.S. PATENT DOCUMENTS

2007/0177552 A1* 8/2007 Wu ........................ H04W 88/08
370/335
2010/0103854 A1   4/2010 Lee et al.
(Continued)

FOREIGN PATENT DOCUMENTS

KR  10-2011-0038852 A  4/2011
KR  10-2013-0087258 A  8/2013
WO  WO 2013/068369 A1  5/2013

Primary Examiner — Edan Orgad
Assistant Examiner — Emmanuel Maglo
(74) Attorney, Agent, or Firm — Birch, Stewart, Kolasch & Birch, LLP

(57) ABSTRACT

Provided is a method for receiving system information by a terminal in a cloud wireless communication system including one or more baseband units (BBUs) and remote radio units (RRUs), the one or more RRUs being connected to a particular BBU among the BBUs to provide a direct service to the terminal via one or more cells. The method is characterized in that the terminal receives, from the network, an identifier that can understand whether there are any changes in the BBU, the RRU, and the cell, and through the received identifier understands whether there are one or more changes among the BBU, the RRU, and the cell, and selectively receives, from the network, the only system information required for any one among the BBU change, the RRU change, and the cell change.

11 Claims, 11 Drawing Sheets

(56) References Cited

U.S. PATENT DOCUMENTS

| | | | |
|---|---|---|---|
| 2010/0297991 A1* | 11/2010 | Dahlman | H04L 1/08 455/422.1 |
| 2012/0155446 A1* | 6/2012 | Machida | H04W 52/0232 370/338 |
| 2012/0208541 A1 | 8/2012 | Luo et al. | |
| 2012/0213109 A1 | 8/2012 | Xu et al. | |
| 2012/0236776 A1* | 9/2012 | Zhang | H04W 48/12 370/312 |
| 2013/0017823 A1* | 1/2013 | Mao | H04W 36/04 455/424 |
| 2013/0084868 A1 | 4/2013 | Song et al. | |
| 2013/0100907 A1* | 4/2013 | Liu | H04L 5/0023 370/329 |
| 2013/0170353 A1* | 7/2013 | Liu | H04W 28/0289 370/235 |
| 2013/0182657 A1* | 7/2013 | Sun | H04W 36/0083 370/329 |
| 2013/0195042 A1 | 8/2013 | Taori et al. | |
| 2013/0208698 A1 | 8/2013 | Taori et al. | |
| 2013/0235844 A1* | 9/2013 | Ge | H04W 36/00 370/331 |
| 2013/0242829 A1* | 9/2013 | Ge | H04W 56/005 370/311 |
| 2013/0272170 A1* | 10/2013 | Chatterjee | H04W 28/02 370/280 |
| 2014/0003333 A1* | 1/2014 | Ivershen | H04W 24/08 370/328 |
| 2014/0023035 A1* | 1/2014 | Zou | H04W 56/0045 370/331 |
| 2014/0029431 A1* | 1/2014 | Haberland | H04W 88/08 370/235 |
| 2014/0031031 A1* | 1/2014 | Gauvreau | H04L 5/0053 455/426.1 |
| 2014/0036755 A1* | 2/2014 | Lee | H04W 36/26 370/312 |
| 2014/0071912 A1* | 3/2014 | Hou | H04L 5/0035 370/329 |
| 2014/0105056 A1* | 4/2014 | Li | H04W 24/02 370/252 |
| 2014/0161447 A1* | 6/2014 | Graves | H04Q 11/0005 398/48 |
| 2014/0293784 A1* | 10/2014 | Haberland | H04W 28/08 370/235 |
| 2014/0328178 A1* | 11/2014 | Haberland | H04W 28/08 370/235 |
| 2014/0349667 A1* | 11/2014 | Hahn | H04W 76/02 455/452.1 |
| 2015/0003301 A1* | 1/2015 | He | H04B 7/0452 370/280 |
| 2015/0188690 A1* | 7/2015 | Khoryaev | H04W 52/0251 370/280 |
| 2015/0270868 A1* | 9/2015 | Park | H04W 76/02 370/329 |
| 2016/0037511 A1* | 2/2016 | Vincze | H04B 7/024 370/329 |
| 2016/0094446 A1* | 3/2016 | Kazmi | H04L 12/6418 370/392 |
| 2016/0094995 A1* | 3/2016 | Vannithamby | H04W 16/14 370/329 |
| 2016/0227555 A1* | 8/2016 | Haberland | H04W 72/12 |

* cited by examiner

MeNB : macro eNodeB
PeNB : pico eNodeB
FeNB : femto eNodeB

MUE : macro UE
PUE : pico UE
FUE : femto UE

METHOD FOR TRANSCEIVING SYSTEM INFORMATION IN CLOUD WIRELESS COMMUNICATION SYSTEM AND APPARATUS THEREFOR

CROSS REFERENCE TO RELATED APPLICATIONS

This application is the National Phase of PCT International Application No. PCT/KR2014/004844, filed on May 30, 2014, which claims priority under 35 U.S.C. 119(e) to U.S. Provisional Application No. 61/911,479, filed on Dec. 4, 2013, all of which are hereby expressly incorporated by reference into the present application.

TECHNICAL FIELD

This disclosure relates to a method for receiving system information in a cloud-based wireless communication system with load to a terminal reduced, a method for transmitting system information in a network for the same, and a terminal/networking apparatus for the same.

BACKGROUND ART

To guarantee a more stable data service such as multimedia service in future-generation mobile communication, attention has been increasingly drawn to a hierarchical cell structure or heterogeneous cell structure in which micro cells (or pico cells or femto cells) for low power/near field communication are co-located within a macro cell-based homogeneous network.

FIG. 1 illustrates a network environment having a heterogeneous cell structure.

As shown in FIG. 1, one macro cell includes Macro UEs (MUE) served by a macro eNB (MeNB). Additionally, FIG. 1 shows that pico cells, which are a kind of micro cell, are formed at a boundary region of a macro cell and served by Pico eNBs (PeNBs). UEs served by PeNBs may be represented by Pico UEs (PUEs) to distinguish the UEs from MUEs. The PeNBs, which are an example of eNBs providing services to a micro cell or small cell, may correspond to small eNBs of various types.

Since installation of additional macro eNBs is inefficient in terms of cost and complexity relative to system performance improvement, the heterogeneous network structure is expected to be further utilized through installation of micro eNBs as described above.

According to a heterogeneous network structure which is under discussion for a communication network, multiple micro cells coexist in one macro cell, and serve corresponding UEs using resources allocated thereto according to a cell coordination scheme, as shown in FIG. 1.

DISCLOSURE

Technical Problem

It is expected that the number of times of movement of a UE from a source cell to a target cell will inevitably increase in a heterogeneous network environment as described above. In particular, this tendency may increase load to the UE in receiving system information about a new cell or network connection as switch of connection of the UE frequently occurs in a cloud network environment which enables implementation of a network cloud.

Technical Solution

The object of the present invention can be achieved by providing a method for receiving system information by a terminal in a cloud wireless communication system including at least one baseband unit (BBU) and at least one remote radio unit (RRH) connected to a specific BBU of the at least one BBU to directly provide a service for the terminal via at least one cell. The method includes receiving an identifier from a network, the identifier allowing the terminal to recognize whether a BBU, RRU and cell are changed therethough, checking whether at least one of the BBU, the RRU and the cell is changed through the received identifier, and selectively receiving, from the network, only system information necessary for change of one of the BBU, the RRU and the cell.

The terminal may move from a source cell to a target cell, wherein the network may provide a service for the target cell.

Alternatively, the terminal may perform cell selection or reselection, wherein the network may provide a service for a cell selected or reselected by the terminal.

The system information may be divided into BBU specific information, RRU specific information, and cell specific information. In this case, the system information may be divided into the BBU specific information, the RRU specific information, and the cell specific information according to types of system information transmission blocks, or may be divided into the BBU specific information, the RRU specific information, and the cell specific information according to types of system information transmission blocks, regardless of types of system information transmission blocks.

The identifier may include at least one of a virtual BBU pool ID, a BBU ID and an RRU ID.

The method may further include receiving system information scheduling information from the network, wherein the selective receiving is performed according to the received system information scheduling information.

The system information scheduling information may contain an identifier indicating a BBU group, RRU group and carrier group to which a specific system information block is to be applied. The system information scheduling information may further contain a unit field indicating whether the specific system information block includes BBU common information, RRU common information, or carrier common information.

In another aspect of the present invention, provided herein is a method for transmitting system information to a terminal in a cloud wireless communication system including at least one baseband unit (BBU) and at least one remote radio unit (RRH) connected to a specific BBU of the at least one BBU to directly provide a service for the terminal via at least one cell. The method includes transmitting an identifier from a network the terminal, the identifier allowing the terminal to recognize whether a BBU, RRU and cell is changed therethough, and distinguishing and transmitting, from the network, only system information necessary for change of one of a BBU, RRU and cell such that the terminal selectively receives the system information according to whether or not at least one of the BBU, the RRU and the cell is changed.

In another aspect of the present invention, provided herein is a terminal operating in a cloud wireless communication system including at least one baseband unit (BBU) and at least one remote radio unit (RRH) connected to a specific BBU of the at least one BBU to directly provide a service for the terminal via at least one cell. The terminal includes a receiver for receiving, from a network, an identifier for recognizing whether a BBU, RRU and cell are changed, and a processor connected to the receiver and configured to check whether at least one of the BBU, the RRU and the cell is changed through the received identifier, wherein the processor performs a control operation to selectively receive, from the network, only system information necessary for change of one of the BBU, the RRU and the cell through the receiver.

In another aspect of the present invention, provided herein is a network apparatus operating in a cloud wireless communication system including at least one baseband unit (BBU) and at least one remote radio unit (RRH) connected to a specific BBU of the at least one BBU to directly provide a service for a terminal via at least one cell. The network apparatus includes a transmitter configured to transmit, to the terminal, an identifier for recognizing whether a BBU, RRU and cell is changed, and a processor connected to the transmitter to perform a control operation to distinguish and transmit only system information necessary for change of one of a BBU, RRU and cell such that the terminal selectively receives the system information according to whether or not at least one of the BBU, the RRU and the cell is changed.

Advantageous Effects

According to the technology described above, load to a UE according to acquisition of system information in a heterogeneous network environment such as a cloud WLAN environment may be reduced.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, well-known structures and devices are omitted in order to avoid obscuring the concepts of the present invention and important functions of the structures and devices are shown in block diagram form.

As described above, the following description relates to a technology for transceiving system information with load to a UE reduced in a cloud-based wireless communication system. To this end, change of a conventional heterogeneous network to a cloud-based wireless communication system will be described.

Figure 2:
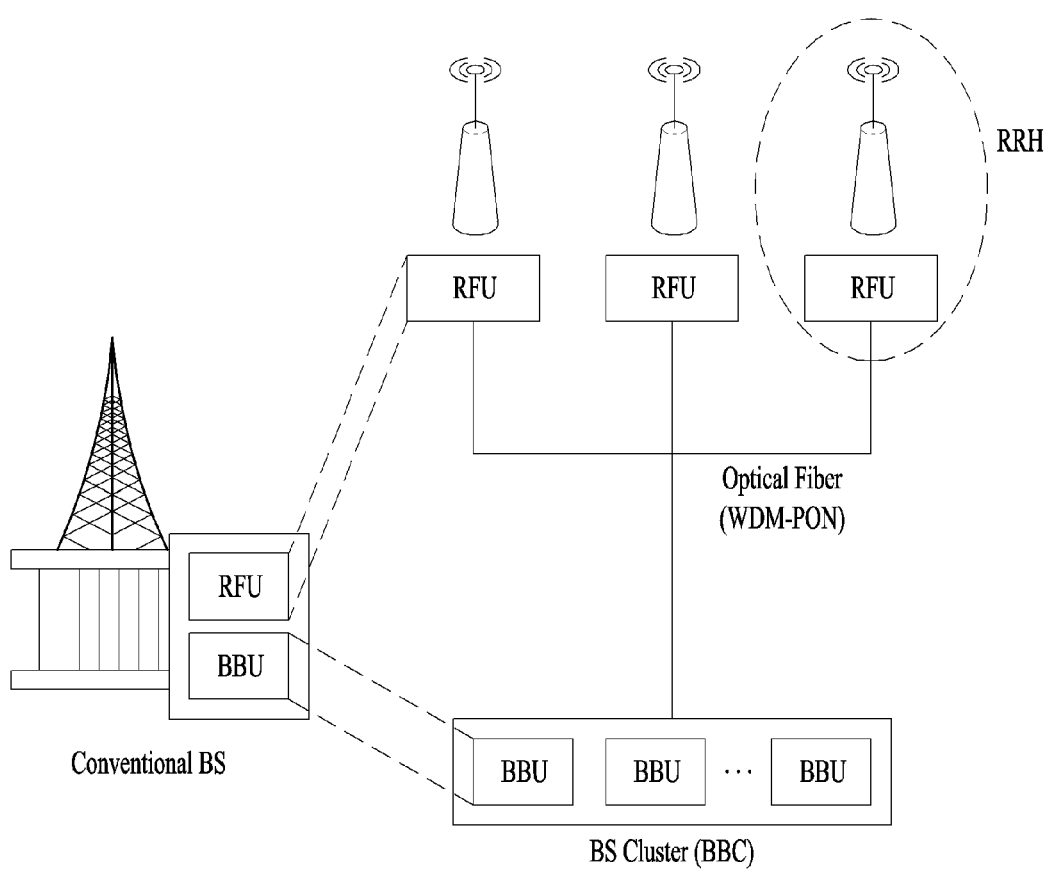
FIG. 2 illustrates the concept of an RRH of a cloud-based wireless communication system.

FIG. 2 illustrates the concept of an RRH of a cloud-based wireless communication system.

Three core technologies enabling implementation of a network cloud may be Remote Radio Head (RRH)/CoMP, software modem technology and cloud computing. In the field of wireless access networking, the most important thing needed to implement the network cloud is introduction of RRH. The RRH, which is a very important element in terms of wireless transmission, serves as a factor causing innovative change of the radio access network structure.

The RRH, which was originally developed as a kind of optical relay, has recently begun to be used as a core element for implementation of a centralized eNB. As shown in FIG. 2, introduction of RRH has physically divided a radio frequency unit (RFU) or remote radio unit (RRU) from a baseband unit (BBU), and thus physical eNBs need not be distributed anymore. As shown in FIG. 2, the functions of the conventional eNBs are divided into RFU or RRU for transmission and reception of radio signals and BBU for processing within an eNB, and both units may be connected by an optical fiber (WDM-PON). However, embodiments of the present invention need not be limited thereto.

For a cloud access network that has been recently introduced, one apparatus is allowed to manage the network in operative connection with hundreds of RRHs. As a result, a cell conceptually different from the conventional cell has been established.

In all communication systems up to 4G, all radio access has been defined based on cells. However, with the structural change as described above, a new concept of cell is needed. In current 3GPP, various implementation scenarios for a situation in which the RRH and an MeNB coexist are under discussion in the CoMP (Coordinated Multi-Point) Work Item of Release 11. Recently, research has been conducted on the concept of multiple cells sharing one RRH as in the case of a shared antenna system (SAS). The concept of dynamically changing a cell region by coordinating an RRH cluster according to situation is also under study.

With this trend, attention has been increasingly drawn to a Cloud Radio Access Network (C-RAN) project.

Figure 3:
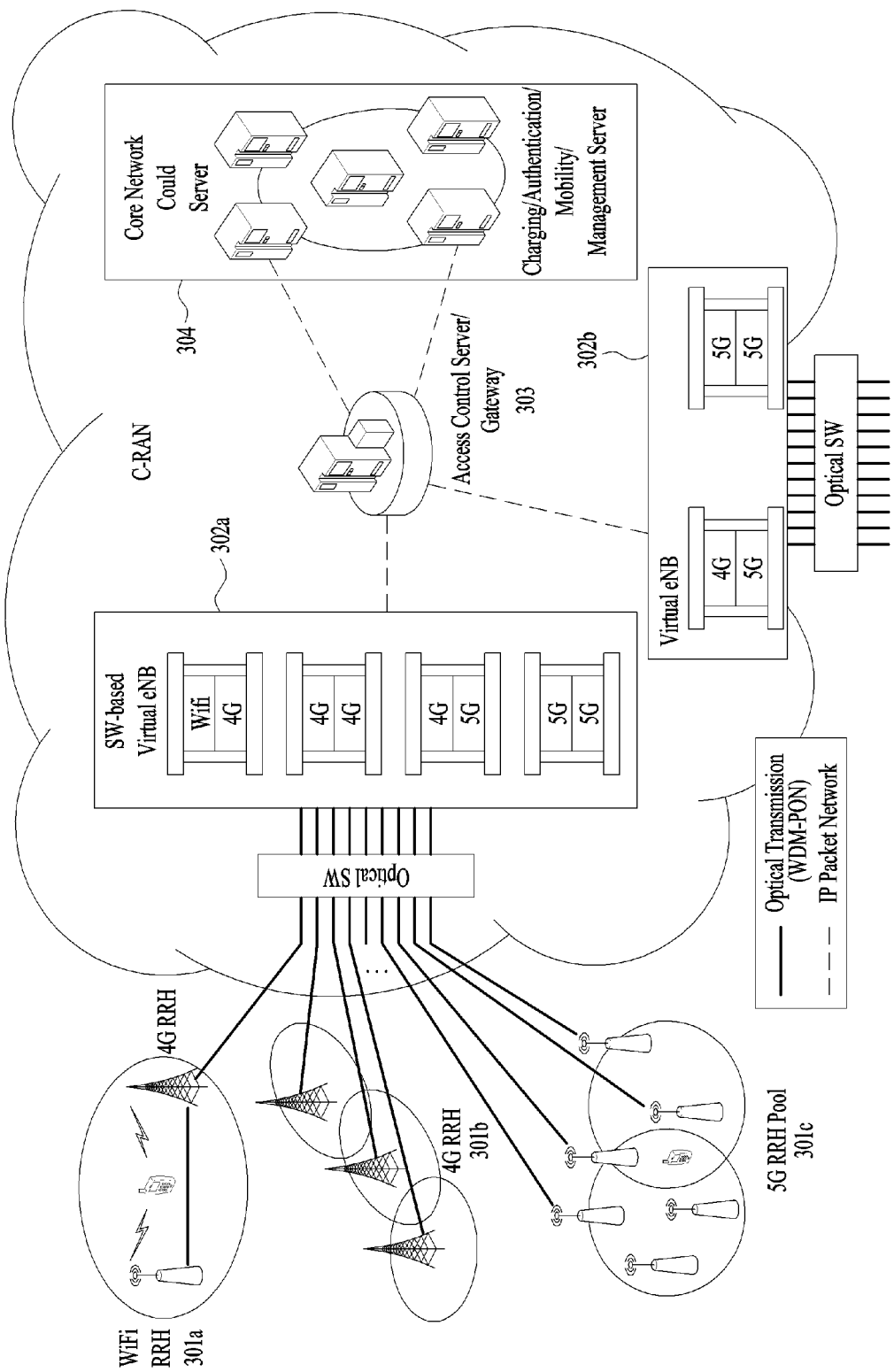
FIG. 3 illustrates the concept of a cloud radio access network to which the present invention is applied.

FIG. 3 illustrates the concept of a cloud radio access network to which the present invention is applied.

As shown in FIG. 3, multiple RRHs 301a, 301b and 301c may access a virtual eNB 302a through an optical access apparatus. The RRHs may use various radio access schemes including LTE, HSPA and WiMAX/Wi-Fi. The virtual eNBs 302a and 302b may be implemented by software, using various radio access technologies including LTE, HSPA and WiMAX/Wi-Fi. Services of the virtual eNBs 302a and 302b may be controlled as the virtual eNBs 302a and 302b are connected to an access control server 303 and a core network could server 304.

RRHs need to establish a relationship of one-to-one correspondence with virtual eNBs. As shown in FIG. 3, one or more RRHs 301a, 301b and 301c may be controlled through one virtual eNB 302a. Thereby, while the cell region is fixed in conventional cases, cells may be dynamically allocated in C-RAN by dynamically changing the RRH cluster.

Due to structural properties of the C-RAN SAS environment, there may be various cases of movement of a UE. For example, the UE may move from a source cell (or carrier) used by a specific RRU to a target cell (or carrier), from the source RRU of a specific BBU to a target RRU, or from a source BBU to a target BBU in a specific network. Thereby, UE load may increase as the UE needs to acquire system information each time the UE moves to a new target.

Specifically, when carriers (or RRUs) are switched, or a carrier (or RRU) is added, the UE receives a system information block transmitted from each cell. This situation may be frequently encountered in the C-RAN SAS environment or small cell deployment environment, and delay may occur while the UE receives a lot of SIB information. In particular, if a long delay occurs, the UE may suffer, for example, radio link failure (RLF). Thereby, system performance may be degraded.

To address this issue, according to an embodiment, it is proposed that system information be classified into BBU/RRU/carrier-specific system information (SI) using the structural properties and transmitted in the C-RAN SAS environment. That is, the UE may move from a source cell to a target cell when the carrier (cell) is changed without change of a BBU and RRU, when the RRU is changed, when the BBU is changed, or the like. Accordingly, system information may be designed in consideration of the aforementioned network structure, and the UE may only receive necessary system information to reduce UE load in acquiring system information.

That is, in this embodiment, it is proposed that the UE acquire only SIB information other than pre-acquired SIB information in the C-RAN SAS environment to reduce UE load and improve system performance. To this end, when carriers (or RRUs) are switched (moved), or a carrier (or RRU) is added, the UE may recognize a BBU/RRU/carrier that is changed, and then receive the entirety or a part of SI (including BBU/RRU/carrier-specific SI) which is being transmitted over a specific carrier, according to the recognized information. For example, when the UE switches from one carrier to another carrier having the same BBU and RRU, the UE may receive only carrier-specific SI.

Figure 1:
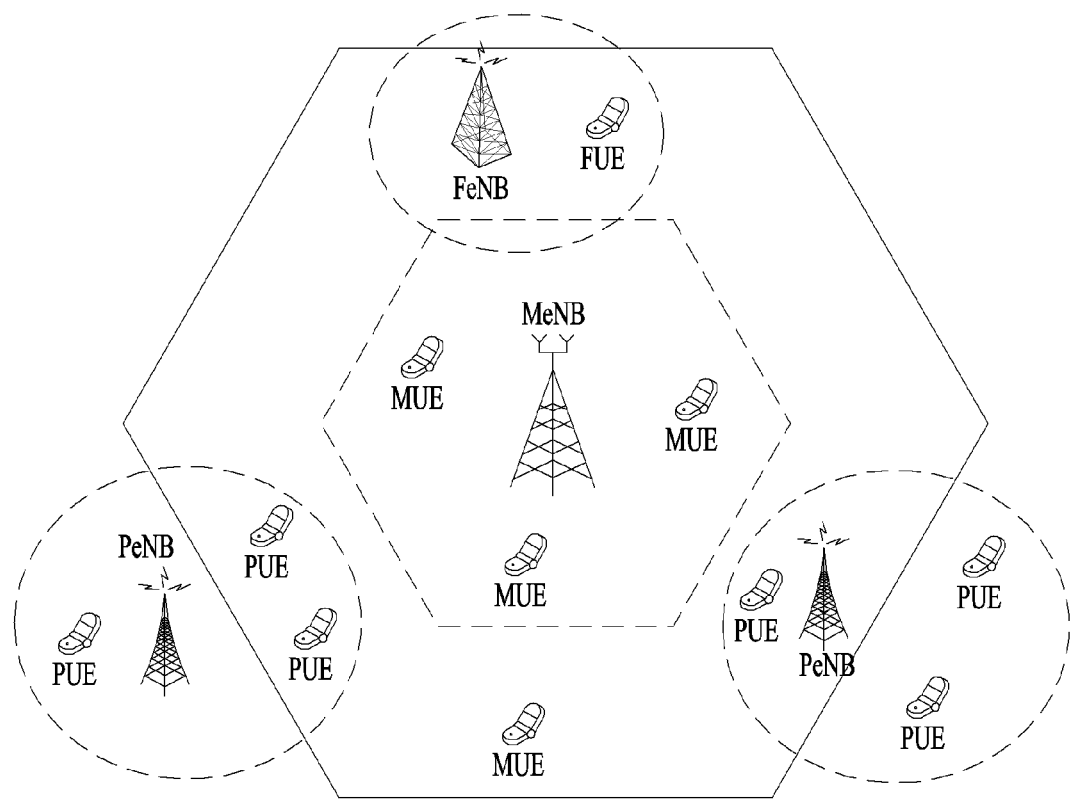
FIG. 1 illustrates a network environment having a heterogeneous cell structure.

The method proposed in the embodiment described above assumes the C-RAN SAS environment for simplicity of description. This method may also be applied to the small cell environment or heterogeneous network environment described above in relation to FIG. 1.

Hereinafter, various network deployment structures will be discussed as specific examples to which the embodiment described above is applicable.

Figure 4:
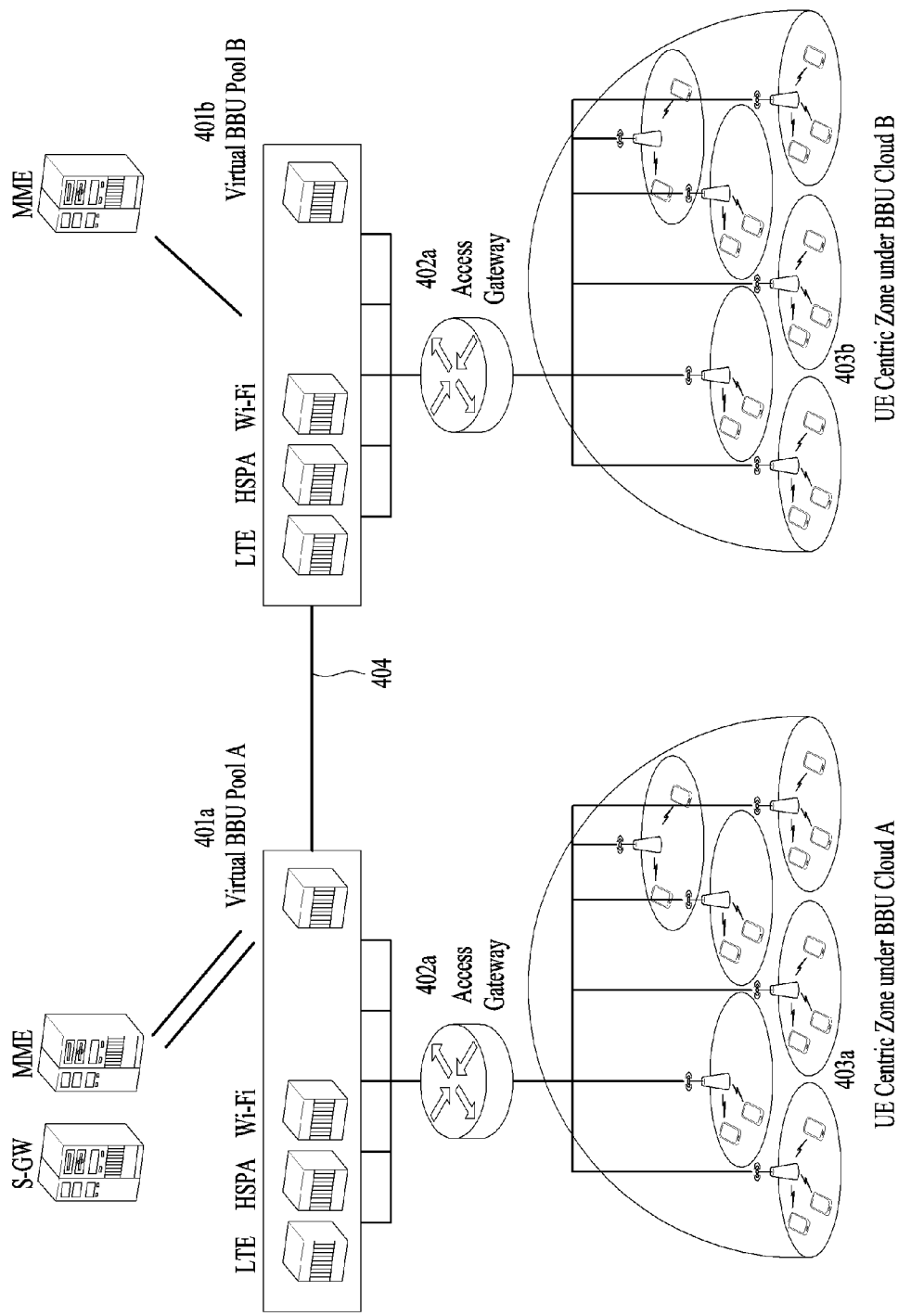
FIG. 4 illustrates a cloud RAN structure to which an embodiment of the present invention is applicable.

FIG. 4 illustrates a cloud RAN structure to which an embodiment of the present invention is applicable. Specifically, FIG. 4 shows the structure of a cloud RAN at which the 5G wireless network is oriented.

The 5G cloud RAN may have virtual BBU pools 401a and 401b, and each BBU pool 401a, 401b may include a plurality of BBUs. Each BBU pool 401a, 401b may be associated with an SAS RRU 403a, 403b supporting Multi-RAT, via an access gateway (GW) 402a, 402b.

BBUs in a virtual BBU are defined as BBUs supporting multiple RATs. One RRU may be associated with one or more BBUs at a specific time, and controlled by the BBU associated therewith. Connection between RRUs and BBUs in a virtual BBU pool assumes ideal backhaul, and one virtual BBU pool may be connected with another virtual BBU pool via an X2-like interface 404. An RRU may be time-variably switched from one BBU to another according to situation (e.g., load, use of resources, etc.).

In the C-RAN SAS environment, various mapping relationships may be established among BBUs/RRUs/carriers. A detailed description is given below. For simplicity, only simple examples will be described. The actual situation may correspond to a combination of the examples. For simplicity, carriers F1 and F2 are exemplarily provided in a situation where two RRUs are present.

Figure 5:
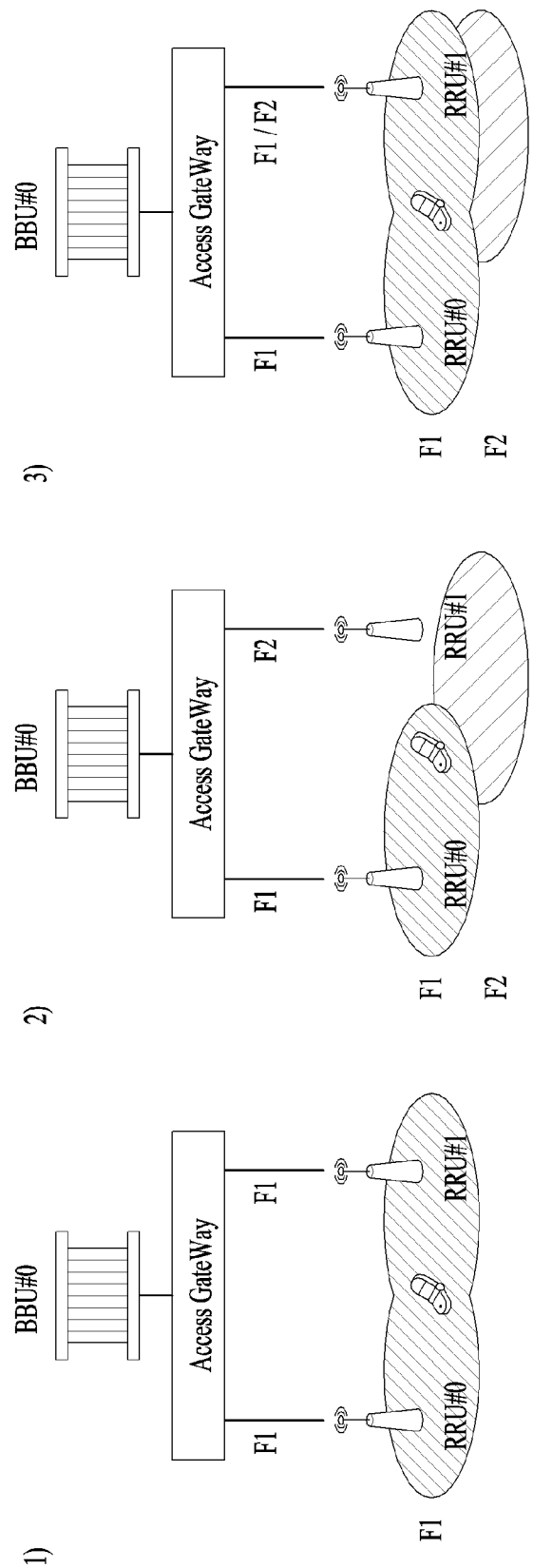
FIGS. 5 to 7 illustrate a mapping relationship among BBUs, RRUs and carriers in a C-RAN environment to which the present invention is applicable.
Figure 6:
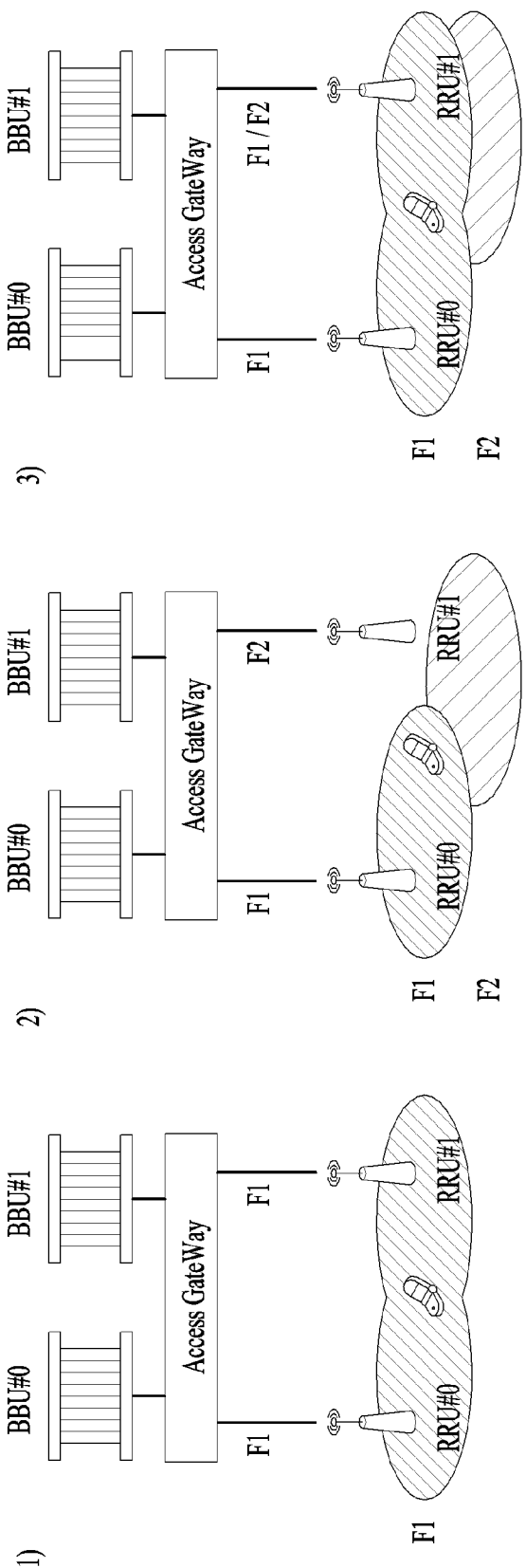
Figure 7:
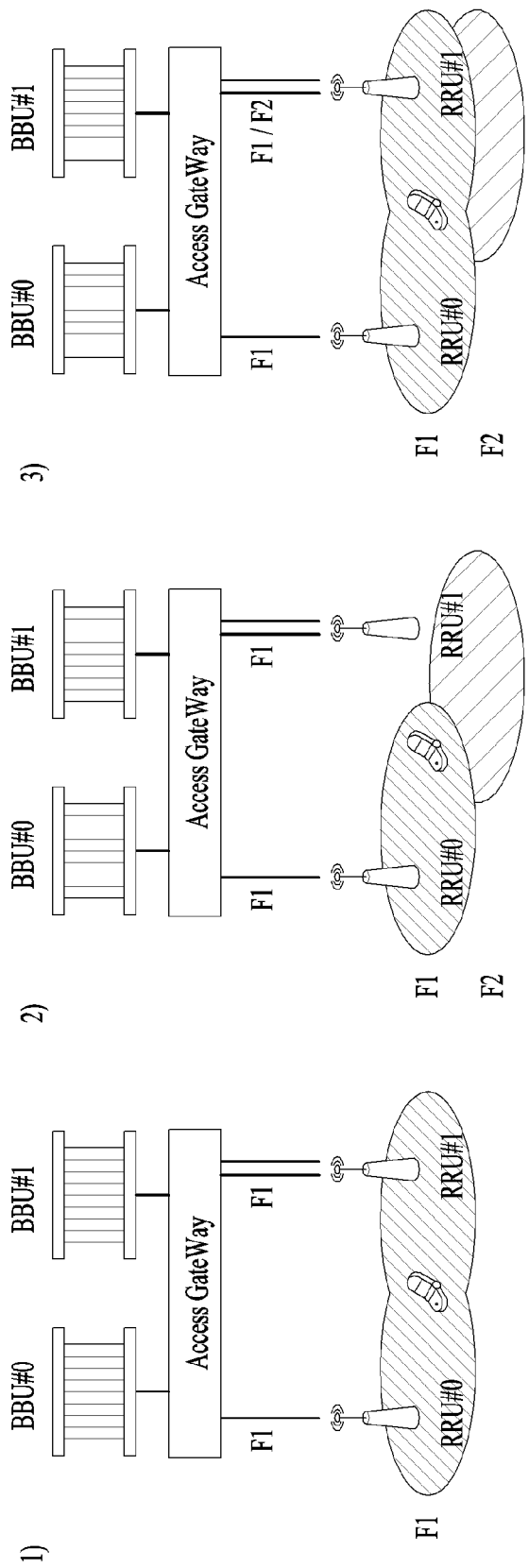

FIGS. 5 to 7 illustrate a mapping relationship among BBUs, RRUs and carriers in a C-RAN environment to which the present invention is applicable.

Specifically, FIG. 5 illustrates a case where one BBU transmits/receives data for a specific UE. In this case, a specific UE may receive data from one BBU via multiple carriers F1 and F2, and the number of RRUs to which the specific UE is connected is a positive integer and is not limited by the number of RRUs.

Referring to FIG. 5, case 1) represents a situation where BBU #0 transmits/receives signals on carrier F1 via RRU #0 and RRU #1, and case 2) represents a situation where BBU #0 transmits/receives a signal via RRU #0 using carrier F1, and transmits/receives a signal via RRU #1 using carrier F2. Case 3) represents a situation where BBU #0 transmits/receives a signal via RRU #0 using carrier F1, and transmits/receives a signal via RRU #1 using carrier F1/F2.

FIG. 6 illustrates a case where multiple BBUs transmit and receive data for a specific UE. In this case, the specific UE may receive the data transmitted from multiple BBUs via multiple carriers, and the number of RRUs to which the specific UE is connected is a positive integer and is not limited by the number of RRUs.

In FIG. 6, case 1) represents a situation where BBU #0 transmits/receives data using carrier F1 of RRU #0, and BBU #1 transmits/receives data using carrier F1 of RRU #1. Case 2) represents a situation where BBU #0 transmits/receives signals using carrier F1 of RRU #0, and BBU #1 transmits/receives signals using carrier F2 of RRU #1. Case 3) represents a situation where BBU #0 transmits/receives signals using carrier F1 of RRU #0, and BBU #1 transmits/receives signals using carrier F1/F2 of RRU #1.

FIG. 7 illustrates a case where multiple BBUs transmit/receive signals using a specific carrier. That is, multiple BBUs may coordinate resources of the specific carrier, and each BBU may transmit/receive a signal using a coordinated resource. In this case, similar to the case of FIG. 6, multiple BBUs transmit/receive signals for a specific UE. The specific UE may receive signals transmitted from multiple BBUs via multiple carriers, and the number of RRUs to which the specific UE is connected is a positive integer and is not limited by the number of RRUs.

In FIG. 7, case 1) represents a situation where BBU #0 transmits/receives signals using both carrier F1 of RRU #0 and carrier F1 of RRU #1, and BBU #1 transmits/receives data using carrier F1 of RRU #1. Case 2) represents a situation where BBU #0 transmits/receives signals using carrier F1 of RRU #0 and carrier F2 of RRU #1, and BBU #1 transmits/receives signals using carrier F2 of RRU #1.

Case 3) represents a situation where BBU #0 transmits/receives signals using carrier F1 of RRU #0 and carrier F1 and/or carrier F2 of RRU #1, and BBU #1 transmits/receives signals using carrier F1/F2 of RRU #1.

That is, FIG. 7 illustrates cases where a specific BBU uses carriers of two or more RRU.

In the network deployment environment as described above in relation to FIGS. 5 to 7, in order to transmit system information by distinguishing the system information into BBU/RRU/carrier-specific information and to allow a UE to selectively receive only system information that matches with the change situation thereof, whether or not a BBU/RRU/carrier is changed needs to be correctly recognized. To this end, an identifier structure for recognizing change of a network deployment structure is proposed according to another embodiment of the present invention.

Figure 8:
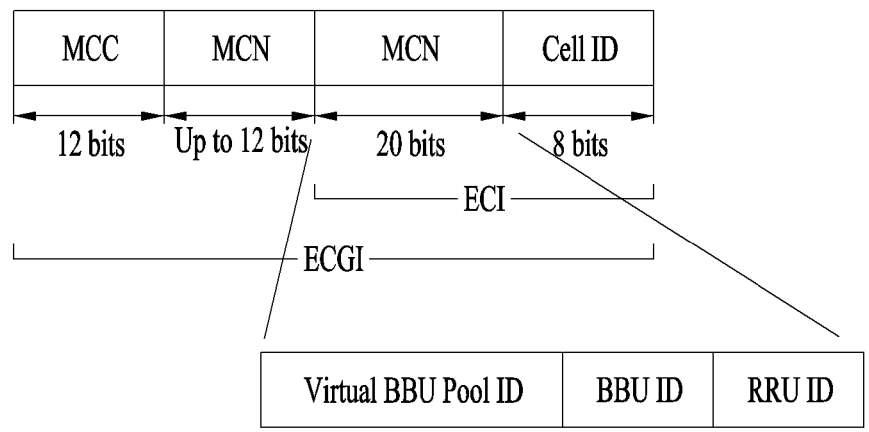
FIG. 8 illustrates the concept of a network identifier in a C-RAN SAS environment according to an embodiment of the present invention.

FIG. 8 illustrates the concept of a network identifier in a C-RAN SAS environment according to an embodiment of the present invention.

As shown in FIG. 8, an eNB ID and global eNB ID are used in the legacy LTE Rel-8/9/10/11 to identify an eNB, and an ECI (E-UTRAN Cell Identifier) or ECGI (E-UTRAN Cell Global Identifier) formed by concatenating a cell ID with the eNB ID and Global eNB ID is used as an identifier for cells constituting the eNB.

Such ID is transmitted to an eNB when a specific UE performs measurement and reports a result of the measurement to the eNB. Thereby, when X2 is configured between two eNBs or HO (Handover) needs to be performed, the ID assists an eNB layer in accurately distinguishing between the respective eNBs.

In the C-RAN SAS environment, BBUs and RRUs perform the function of the eNB, and thus the eNB ID used in LTE Rel-8/9/10/11 may not be used. Accordingly, as shown in FIG. 8, for the eNB ID used in LTE, a virtual BBU pool ID, BBU ID, and RRU ID may be configured with X bits, Y bits and Z bits, respectively (wherein X, Y, and Z are positive integers). Among these fields, a specific field may be omitted when necessary.

For example, when an ID configured by MCC, MNC and BBU ID is globally unique, the virtual BBU pool ID may be omitted. That is, when a specific BBU is identifiable using a PLMN and BBU ID, the virtual BBU pool ID may be omitted. Alternatively, if the BBU ID is reused in the unit of virtual BBU pool, a specific BBU cannot be identified by the PLMN and BBU ID. Accordingly, in this case, a virtual BBU pool ID capable of distinguishing a virtual BBU pool may be added. In addition, as the RRU ID is included, a cell ID used in LTE Rel-8/9/10/11 may be configured with less than 8 bits.

An operator may configure the BBU ID and RRU ID when performing system deployment. The RRU ID may be reused within the unit of a virtual BBU pool, A-GW or MME. The unit for reuse may be associated with a unit forming the basis of connection with a specific RRU. For example, if a specific RRU discussed in FIG. 4 fails to switch to an entity beyond a BBU pool, namely if the RRU is not directly connected to an A-GW in another virtual BBU pool, the RRU ID may be reused in units of virtual BBU.

Alternatively, a field indicating A-GW ID may be added to the aforementioned identifier. In this case, the RRU ID may be reused in the unit of A-GW, and the RRU ID may be configured as far from an RRU ID connected to another neighboring A-GW as possible. That is, when an RRU is reused, the RRU is configured to be as far from an RRU using the same ID as possible. Such RRU ID (or RRU ID+Cell ID) may be used in place of the existing PCID when the same RRU ID constitutes a reference signal or other physical signals.

According to another embodiment of the present invention, an ID used in a physical layer may be used differently from the RRU ID. That is, separately from the RRU ID for distinguishing between the RRUs in a higher layer, an ID which is used only in the physical layer may be additionally defined. The existing PCID (Physical cell ID) may be used as this ID. This ID may also be used when configuring a reference signal or other physical signals.

Hereinafter, a description will be given of a method for configuring system information such that a UE can selectively receive the system information when change of a BBU/RRU/carrier is recognizable using the aforementioned identifier.

Figure 9:
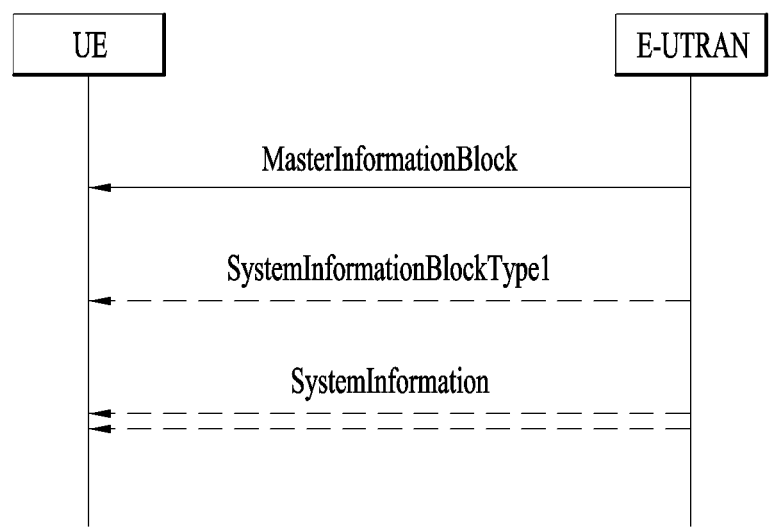
FIG. 9 illustrates a procedure of a UE receiving system information in an LTE-A system.

FIG. 9 illustrates a procedure of a UE receiving system information in an LTE-A system.

In the LTE-A system, a UE may perform the procedure of acquiring system information for various reasons including completion of cell selection/reselection and handover. In the LTE-A system, the system information acquired by the UE is divided into a master information block (MIB), system information blocks (SIBs) and other system information (SI) according to importance/usage thereof. Messages carrying respective system information may be assigned A different transmission periods and schemes. Specifically, 16 types of system blocks are provided in LTE-A, and each SIB includes different system information.

Figure 10:
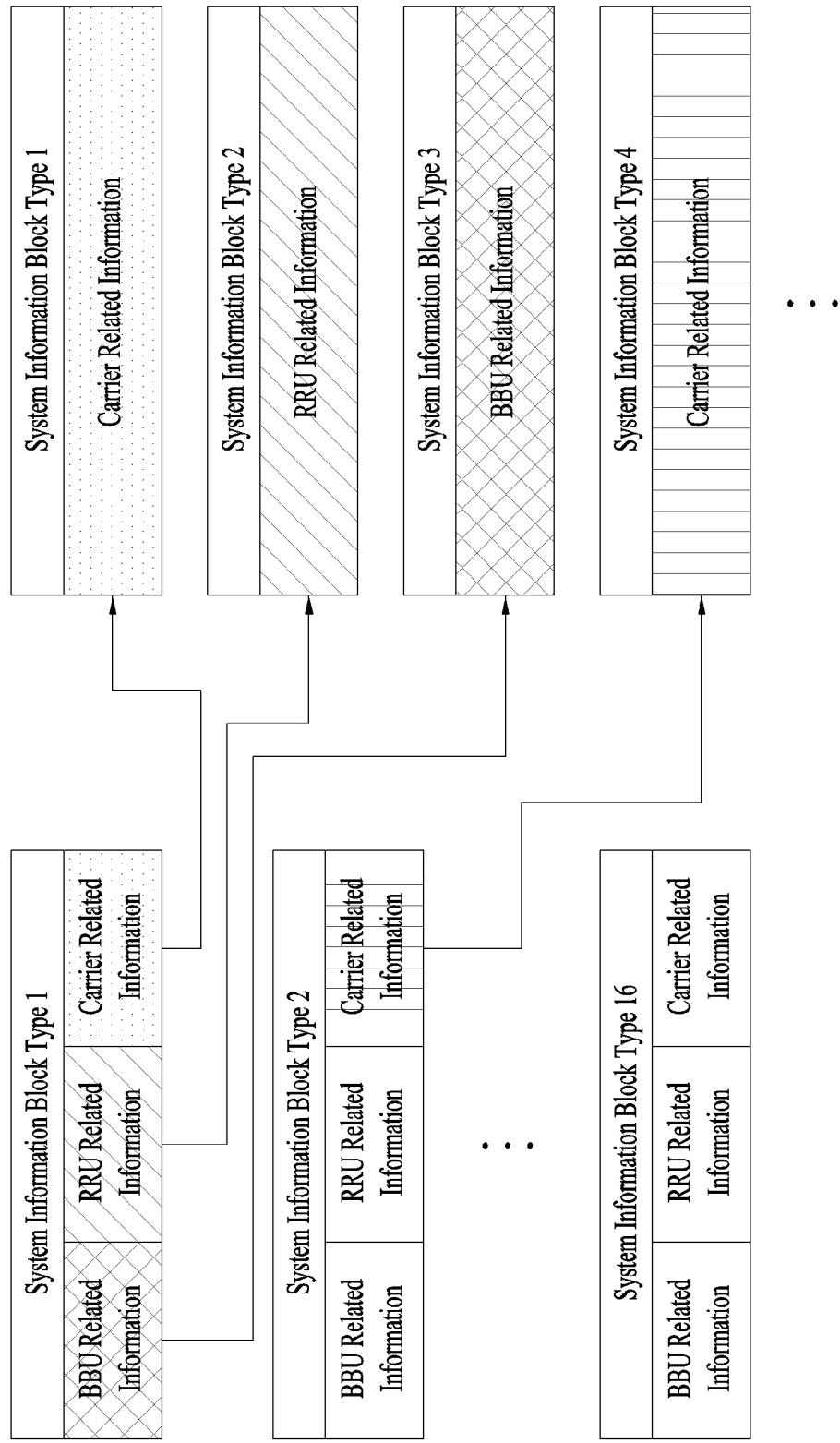
FIG. 10 illustrates a method for configuring system information according to an embodiment of the present invention.

FIG. 10 illustrates a method for configuring system information according to an embodiment of the present invention.

In the embodiment of FIG. 10, BBU specific information, RRU specific information, and carrier specific information are distinguishably transmitted on the respective SIB types while the existing SIB types are maintained. For example, respective information configurable according to properties thereof, i.e., in a BBU unit, an RRU unit and a carrier unit in SIB type 1 may be configured with a new system information block type.

For example, as shown in FIG. 10, SIB 1 may be divided into common information of a BBU unit (or group), an RRU unit (or group) and a carrier unit (or group) to configure new SIBs 1, 2 and 3.

That is, according to one embodiment of the present invention, in the C-RAN SAS, an SIB may be divided into common information in a BBU unit, common information in an RRU unit, and common information in a carrier unit. Such SIB may be generated from a BBU. The method proposed in this embodiment may be more effective when there is a lot of common SIB information. This may be a case where a group of RRUs operates as a cell. In addition, when the same frequency is used and one BBU is connected, there may be a lot of common SIB information. However, the embodiments of the preservation are not limited thereto.

Hereinafter, description will be given of examples of common information in a BBU unit, common information in an RRU unit, and common information in a carrier unit. The following embodiment is based on the system information structure in LTE as in the case of FIG. 10, but embodiments which will be described later need not be limited thereto.

System Information Block Type 1

In SIB type 1, Table 1 shows common information in a BBU unit/RRU unit which is configurable in a carrier unit.

TABLE 1

| Information name | Description |
| --- | --- |
| plmn-IdentityList | Indicates a set of PLMNs defining when the UE performs measurement logging as well as the associated status indication and information retrieval i.e. the UE performs these actions when the RPLMN is part of this set of PLMNs |
| cellBarred | Indication of barred cell |
| ims-EmergencySupport-r9 | Indicates whether the cell supports IMS emergency bearer services for UEs in limited service mode. If absent, IMS emergency call is not supported by the network in the cell for UEs in limited service mode. |
| csg-Indication | If set to TRUE the UE is only allowed to access the cell if it is a CSG member cell, if selected during manual CSG selection or to obtain limited service. |
| csg-Identity | Identity of the Closed Subscriber Group the cell belongs to. |

Table 2 shows examples of information configurable in an RRU unit in SIB type 1.

TABLE 2

| Information name | Description |
| --- | --- |
| TrackingAreaCode | The IE TrackingAreaCode is used to identify a tracking area within the scope of a PLMN |

Table 3 shows carrier selection-related information configurable in a carrier unit in SIB type 1.

TABLE 3

| Information name | Description |
| --- | --- |
| cellIdentity | The IE CellIdentity is used to unambiguously identify a cell within a PLMN |
| intraFreqReselection | Used to control cell reselection to intra-frequency cells when the highest ranked cell is barred, or treated as barred by the UE. |
| cellSelectionInfo | Criteria for cell selection |
| p-Max | Value applicable for the cell. If absent the UE applies the maximum power according to the UE capability. |
| freqBandIndicator | The IE FreqBandIndicator indicates the E-UTRA operating band. |
| tdd-Config | The IE TDD-Config is used to specify the TDD specific physical channel configuration |
| multiBandInfoList-v9e0 | Indication of multiple band |

Herein, cellIdentity may employ identifiers of an eNB and cell which are newly defined in the aforementioned C-RAN SAS environment.

Table 4 shows SI-related information configurable in a carrier unit in SIB type 1.

TABLE 4

| Information name | Description |
| --- | --- |
| schedulingInfoList | Scheduling information for transmitting of SI |
| si-WindowLength | Common SI scheduling window for all SIs. Unit in milliseconds, where ms 1 denotes 1 millisecond, ms 2 denotes 2 milliseconds and so on |
| systemInfoValueTag | Common for all SIBs other than MIB, SIB1, SIB10, SIB11, SIB12 and SIB14. Change of MIB and SIB1 is detected by acquisition of the corresponding message. |

System Information Block Type 2

Table 5 shows common information in a BBU unit/RRU unit which is configurable in a carrier unit in SIB type 2.

TABLE 5

| Information name | Description |
| --- | --- |
| ac-BarringInfo(ac-BarringForEmergency | Access class barring for AC 10 |
| ac-BarringForMO-Signalling | Access class barring for mobile originating signalling |
| ac-BarringForMO-Data | Access class barring for mobile originating calls. |
| ssac-BarringForMMTEL-Voice-r9 | Service specific access class barring for MMTEL voice originating calls. |
| ssac-BarringForMMTEL-Video-r9 | Service specific access class barring for MMTEL video originating calls |

Table 6 shows information configurable in a carrier unit in SIB type 2.

TABLE 6

| Information name | Description |
| --- | --- |
| radioResource-ConfigCommon | The IE RadioResourceConfigCommonSIB and IE RadioResourceConfigCommon are used to specify common radio resource configurations in the system information and in the mobility control information, respectively, e.g., the random access parameters and the static physical layer parameters. |
| ue-TimersAnd-Constants | The IE UE-TimersAndConstants contains timers and constants used by the UE in either RRC_CONNECTED or RRC_IDLE. |
| freqInfo | Including (ul-CarrierFreq, ul-Bandwidth, additionalSpectrumEmission) |
| mbsfn-Subframe-ConfigList | Information on the configuration of MBMS subframe |
| timeAlignment-TimerCommon | Time Alignment timer value |

System Information Block Types 3-5

SIB type 3 includes information for cell reselection between frequencies, within a frequency or between heterogeneous networks, and SIB type 4 includes information about a neighboring cell within a frequency. SIB type 5 includes information for cell reselection between frequencies, for example, information about resources between frequencies related to cell reselection and information about other E-UTRA frequencies.

In SIBs 3 to 5, common information in an RRU unit which is configurable in a carrier unit may include neighboring cell list information for cell reselection within a frequency/between frequencies.

System Information Block Types 6-8

SIB type 6 includes information about a UTRA frequency and a UTRA neighboring cell related to cell reselection as information for inter-RAT cell reselection, and SIB type 7 includes GERAN frequency information related to cell reselection as information for inter-RAT cell reselection. SIB type 8 includes information about a CDMA2000 frequency and CDMA2000 neighboring cell related to cell reselection as information for inter-RAT cell reselection.

In SIB types 6 to 8, common information in an RRU unit which is configurable in a carrier unit may include a parameter for inter-RAT cell reselection including a CDMA2000 neighboring cell list.

Table 7 shows information configurable as common information in other SIB types.

TABLE 7

| SIB type | Common information | Information name |
|---|---|---|
| Type 9 | Common information in a BBU unit/RRU unit | HNB name |
| Type 10/11 | Common information in an RRU unit | ETWS information |
| Type 12 | Common information in an RRU unit | CMAS information |
| Type 13 | Common information in an RRU unit | MBSFN-AreaInfoList-r9 |
| | carrier unit information | MBMS-NotificationConfig-r9 |
| Type 15 | System Information Block Common information in a BBU unit/RRU unit | eab-Param-r11 |
| Type 16 | Common information in an RRU unit | TimeInfo-r11 |

In the table above, the name of each piece of information may be the same as defined in the legacy LTE standard, but the information may reflect changes necessary for establishment of a cloud network.

Figure 11:
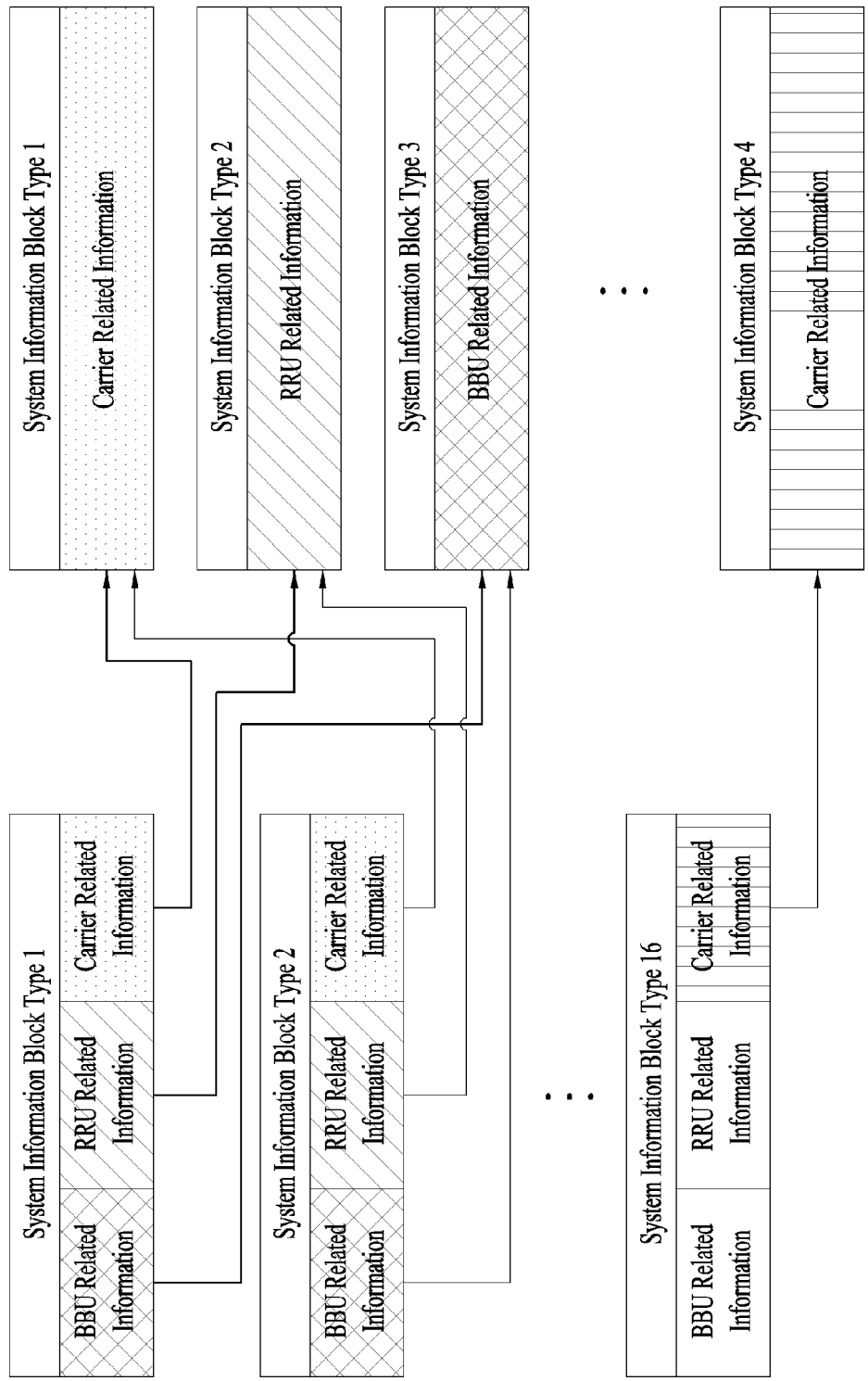
FIG. 11 illustrates a method for configuring system information according to another embodiment of the present invention.

FIG. 11 illustrates a method for configuring system information according to another embodiment of the present invention.

In this embodiment, common information is not extracted for each SIB type to configure an SIB as in the embodiment described above in relation to FIG. 10. Instead, respective pieces of information may be combined regardless of the existing SIB types to configure an SIB in a BBU unit, RRU unit, and carrier unit as shown in FIG. 11.

Referring to FIG. 11, when information of each SIB in LTE is divided into a BBU unit (or group), RRU unit (or group), and carrier unit (or group), such information may be grouped into one SIB. That is, as shown in FIG. 11, carrier-related information in SIB 1 and carrier-related information in SIB 2 may be grouped into SIB 1. In addition, some SIBs may maintain existing forms, but some other SIBs may be reconfigured as a common information unit according to this embodiment, as they need not maintain the existing forms thereof.

If an existing SIB type is maintained, and information in a BBU unit, information in an RRU unit and information in a carrier unit are distinguishably transmitted in the existing SIB, the UE needs to read all system information, and thus a gain may not be obtained. However, if SIBs divided into the respective units as above are transmitted, the UE may check change thereof and establish configuration such that not all SIBs are received. Thereby, UE load may be reduced.

In the description above, the term "system information block" is simply an example, and a new unit may be defined.

In the description above, the network is exemplarily configured in the structures of BBUs, RRUs, and carriers. When a macro cell and a small cell are deployed in the heterogeneous environment as described above, system information may be reconfigured as macro cell common information, small cell common information, and the like.

Hereinafter, a description will be given of a method for presenting a unit (BBU, RRU, carrier) having common information according to another embodiment of the present invention.

If all RRUs connected to a BBU have common information, and this information is configured in a BBU unit as common information, the RRUs need not be distinguished from each other. For common information of all carriers transmitted via a specific RRU, the common information may be configured in an RRU unit. In this case, carriers on which transmission is performed by a specific RRU need not be distinguished from each other.

When system information is reconfigured in a common information unit as described above, a unit in which common information is configured may be indicated with overhead minimized using the following methods.

Embodiment 1

If carrier groups of an RRU group or (the same or different) RRU(s) among RRUs connected to a BBU have information common thereto, information (schedulingInfo-List in LTE) for indicating scheduling information of SIBs may indicate the RRU group or (the same or different) RRU(s) for the common information of the carrier groups.

In this regard, identifiers of an eNB and cell may be used in the C-RAN SAS environment defined above to indicate an RRU or carriers of the RRU corresponding to the common information. Alternatively, for common information of BBUs, identifiers of an eNB and cell may be used in the C-RAN SAS environment defined above to indicate the common information. For specific information for a specific carrier, SIB-GroupIdentity may be omitted. That is, if SIB-GroupIdentity is omitted, identifiers of an eNB and cell may be used in the aforementioned C-RAN SAS environment to indicate that the information is system information for the carrier. Alternatively, an indicator indicating that the information is specific to the specific carrier may be additionally employed.

Table 8 below shows configuration of a system information scheduling message according to this embodiment.

TABLE 8

```
SchedulingInfoList ::= SEQUENCE (SIZE (1 ... maxSI-Message))
    OF SchedulingInfo
SchedulingInfo ::= SEQUENCE {
    si-Periodicity         ENUMERATED {
                               rf8, rf16, rf32, rf64, rf128, rf256, rf512},
    sib-MappingInfo        SIB-MappingInfo
}
SIB-MappingInfo ::= SEQUENCE (SIZE (0 ... maxSIB-1)){
    SIB-Type              ENUMERATED {
                               sibType3, sibType4, sibType5, sibType6,
                               sibType7, sibType8, sibType9, sibType10,
                               sibType11, sibType12-v920, sibType13-v920,
                               sibType14-v1130, sibType15-v1130,
                               sibType16-v1130, spare2, spare1, ...}
    SIB-GroupIdentity     SEQUENCE OF CellIdentity
}
```

Herein, SIB-GroupIdentity may be used to indicate a BBU, RRUs or carriers which have a specific SIB as common information thereof.

Embodiment 2

If CellIdentity is transmitted as in the case of the method proposed above, a large amount of data may be needed since CellIdentity is long. Accordingly, in Embodiment 2, it is proposed that a field indicating a BBU unit (or group), an RRU unit (or group) or a carrier unit (or group) and an ID according to each unit be transmitted.

In addition, this field, which indicates the common level, may be used to indicate that the information is carrier specific information. This method may be used only in a specific case, and may be used together with the method proposed above. In this case, since identifiers of an eNB and a cell are transmitted in the C-RAN SAS environment in which SIBs are transmitted as described above, only IDs according to respective units may be transmitted and recognized.

In the case where a cell ID is reused for an RRU unit, carriers may not be distinguished from each other if carriers associated with other RRUs include common information. Accordingly, in this case, RRU ID may also be delivered to indicate a carrier.

Table 9 below shows configuration of a system information scheduling message according to this embodiment.

TABLE 9

```
SIB-MappingInfo ::= SEQUENCE (SIZE (0 . . . maxSIB−1)){
SIB-Type           ENUMERATED {
                     sibType3, sibType4, sibType5, sibType6,
                     sibType7, sibType8, sibType9, sibType10,
                     sibType11, sibType12-v920, sibType13-v920,
                     sibType14-v1130, sibType15-v1130,
                     sibType16-v1130, spare2, spare1, . . .}
SIB-GroupIndicator ENUMERATED {
                     BBU, RRU, carrier, carrier specific }
SIB-GroupIdentity              SEQUENCE OF BBUIdentity
```

In Table 9, 'SIB-GroupIndicator' may be used to indicate whether system information is BBU specific information, RRU specific information or carrier specific information, and the 'SIB-GroupIdentify' field maybe used to indicate a network to be applied to a corresponding level.

Figure 12:
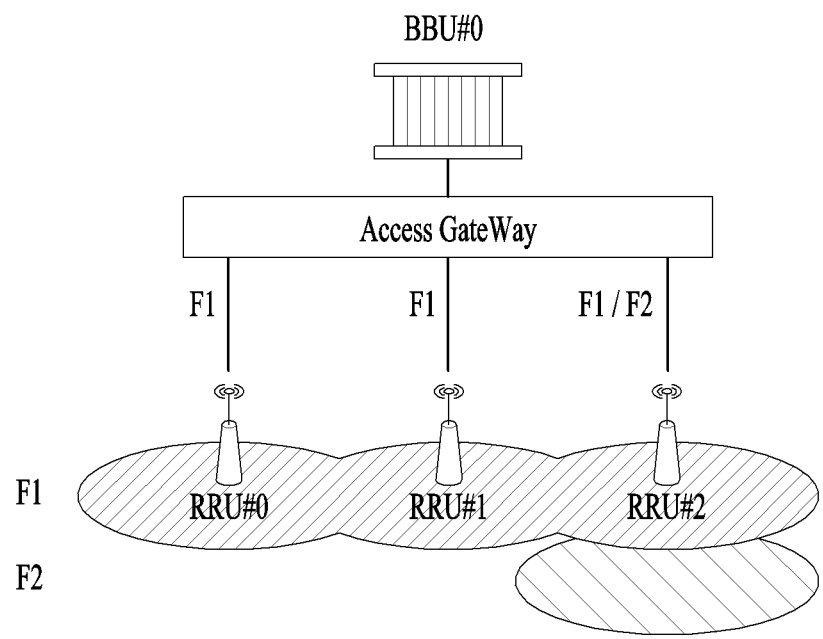
FIG. 12 illustrates an exemplary case of application of the methods of the present invention.

FIG. 12 illustrates an exemplary case of application of the methods of the present invention.

In the example of FIG. 12, RRU#0 and RRU#1 use carrier F1, and RRU#2 uses carrier F1 and carrier F2.

First, an example of application of the method of Embodiment 1 will be described.

When common information is transmitted in a specific SIB on carrier F1 of RRU #0 and RRU #1, not only an SIB type but also the identifiers of an eNB and a cell may be transmitted in the scheduling information. For SIB #2, a new ECGI defined as described above in relation to FIG. 8 may be transmitted as SIB-GroupCellIdentity. When it is assumed that F1 is configured for cell #0 in each RRU, information such as {PLMN ID+BBU #0+RRU #0+cell #0, PLMN ID+BBU #0+RRU #1+cell #0} may be transmitted through SIB-GroupCellIdentity. If SIBs are transmitted in a BBU/RRU/carrier unit only in the PLMN, the ECI defined above may be transmitted. When it is assumed that F1 is configured for cell #0 in each RRU, information such as {BBU #0+RRU #0+cell #0, BBU #0+RRU #1+cell #0} may be transmitted through SIB-GroupCellIdentity.

As another example, when a specific SIB having carrier F1 and carrier F2 of RRU #2 as common carriers in FIG. 12 is transmitted, suppose that carrier F1 of RRU #2 is configured for cell #0, and carrier F2 of RRU #2 is configured for cell #1. In this case, information such as {PLMN ID+BBU #0+RRU #2+cell #0, PLMN ID+BBU #0+RRU #2+cell #1} may be transmitted as SIB-GroupCellIdentity. If SIBs are transmitted in a BBU/RRU/carrier unit only in the PLMN, the ECI defined above may be transmitted. Information such as {BBU #0+RRU #2+cell #0, BBU #0+RRU #2+cell #1} may be transmitted in SIB-GroupCellIdentity.

As another example, in the case where SIB information for carrier f1 defined as cell #0 of RRU #0 connected to BBU #0 is transmitted, only identifiers of an eNB and a cell need to be transmitted in an SIB in the C-RAN SAS environment. That is, if SIB-GroupCellIdentity is omitted from an SIB, the SIB may indicate that the system information is carrier specific information.

Hereinafter, an exemplary case of application of Embodiment 2 will be described. That is, description will be given of transmission of a field (defined as SIB-GroupIndicator in the table above) indicating a unit (or group) in which common information is applied.

For example, suppose that the field is assigned two bits to indicate a unit. In this case, the field may be predefined as follows. If the field is '00', this may indicate a BBU unit (or group). If the field is '01', this may indicate an RRU unit (or group). If the field is '10', this may indicate a carrier unit (or group). If the field is '11', this may indicate carrier specific information.

When this method is applied to the example of FIG. 12, a specific common SIB is transmitted regardless of carriers used in RRU #0 and RRU #1, not only an SIB type but also a field indicating a common unit and IDs according to respective units may be transmitted through SchedulingInfo. If common information is transmitted in an RRU unit, a field indicating the unit may signal '01'. Since the unit is the RRU unit, IDs of respective RRUs may be transmitted. Accordingly, {RRU #0, RRU #1} may be transmitted as IDs according to the unit.

Such information may be transmitted via carrier f1 of RRU #0 and carrier f1 of RRU #1. When the SIB information is transmitted on carrier f1 of RRU #0, information (PLMN, BBU ID) of RRU #1, which uses common SIB information together with RRU #0 based on the identifiers of an eNB and a cell from among other SIB information transmitted on carrier f1 of RRU #0 in the C-RAN SAS environment, may be acquired. An SIB transmitted from RRU #1 may also be used as in the case of RRU #0.

As another example, if carrier f1 and carrier f2 of RRU #2 carry a specific common SIB, not only an SIB type but also a field indicating a unit and IDs according to respective units may be transmitted through SchedulingInfo. When it is assumed that carrier f1 is configured for cell #0 and carrier f2 is configured for cell #1 in RRU #2, the information is common information in a carrier unit (or group), and thus the field indicating the unit may signal '10', and {cell #0, cell #1} indicating the cell IDs of the respective carriers may be transmitted according to the carrier unit.

If such SIB information is transmitted on carrier f1 of RRU #0, information (PLMN, BBU ID, RRU ID) of carrier f2 of RRU #2, which uses common SIB information together with carrier f1 of RRU #2 based on the identifiers of an eNB and a cell from among other SIB information transmitted on carrier f1 of RRU #2 in the C-RAN SAS environment, may be acquired. An SIB transmitted on carrier f2 of RRU #2 may also be similarly used in the case of RRU #0.

As another example, when SIB information for carrier f1 defined as cell #0 of RRU #0 connected with BBU #0 is transmitted, '11' may be transmitted in an SIB through SIB-GroupIndicator to indicate that the information is carrier specific information. If SIB-GroupCellIdentity is omitted from the SIB, the SIB may indicate that the information is carrier specific information indicated by the identifiers of an eNB and cell in the C-RAN SAS environment.

Hereinafter, a procedure of a UE receiving an SIB will be described based on the description given above.

In order for a specific UE to be connected to a cell, information about a specific cell needs to be acquired after synchronization for the specific cell is acquired. In the legacy LTE Rel-8/9/10/11, a UE acquires basic information about a cell by acquiring a broadcast channel (BCH) after acquiring synchronization. First, the UE receives a master information block (MIB), thereby acquiring the system bandwidth, PHICH structure, system frame number, the number of antennas, and 40 ms synchronization. Thereafter, the UE receives a system information block. By receiving this system information block, the UE may acquire the aforementioned information about the system, and be connected to a cell using the information.

In legacy LTE Rel-8/9/10/11, a UE performs a procedure of receiving new SIB information every time a cell is changed. However, in a C-RAN SAS environment having an RRH deployed therein as a small cell, frequent execution of SIB reception applies load to the UE since the coverage of the cell is narrowed. In the embodiments of the present invention described above, a method for a UE to acquire only changed SIB information when the UE moves from a serving cell to a target cell or performs cell reselection in order to lessen UE load and allow the UE to be quickly connected to a cell has been proposed.

When the UE moves from the serving cell to a target cell or performs cell reselection, the UE may receive SIB1 of a specific cell (carrier), thereby receiving identifiers of an eNB and cell in the information about the specific cell in the C-RAN SAS environment. Using the identifiers, the UE may recognize a relationship between the changed cell and the serving cell or previous cell in which the UE was positioned in the idle state. For example, if the identifiers of an eNB and cell are configured in the C-RAN SAS environment using the aforementioned method, the UE may recognize whether the UE has moved to the cell of another BBU, the cell of another RRU or another carrier.

For example, if a specific UE is moved from a cell in which the identifiers of the eNB and cell are PLMN ID+BBU #0+RRU #0+cell #0 to a cell in which the identifiers are PLMN ID+BBU #0+RRU #1+cell #0 in the C-RAN SAS environment received through an SIB or performs reselection, the specific UE may recognize that the UE has moved from the cell of RRU #0 to the cell of RRU #1 and is allowed to maintain connection via BBU #0. In this case, the UE may recognize that the UE need not receive common information in a BBU unit and may reuse common information in the BBU unit of the previous cell given before movement, assuming that the SI content in the BBU unit has not changed. In this case, a cell ID may be reused on an RRU-by-RRU basis, and accordingly the UE may check SIB-GroupIdentity (which may include SIB-GroupIndicator) to recognize whether there is an SIB including common information in a carrier unit for two cells. If SIB-GroupIdentity contains {PLMN ID+BBU #0+RRU #0+cell #0, PLMN ID+BBU #0+RRU #1+cell #0}, the UE may recognize that there is an SIB containing common information of two carriers. In this case, the UE may recognize that the common SIB of the two carriers need not be received again. Thereby, the UE may reuse the common SIB of two carriers received in the previous cell of PLMN ID+BBU #0+RRU #0+cell #0, rather than receiving SIB information.

Alternatively, if SIB-GroupIdentity does not contain {PLMN ID+BBU #0+RRU #0+cell #0, PLMN ID+BBU #0+RRU #1+cell #0}, it may be recognized that there is no SIB containing common information of two carriers.

In addition, if a specific UE is moved from a cell in which the identifiers of the eNB and cell are PLMN ID+BBU #0+RRU #0+cell #0 to a cell in which the identifiers are PLMN ID+BBU #0+RRU #0+cell #1 in the C-RAN SAS environment received through an SIB or performs reselection, the specific UE may recognize that the UE has been moved from cell #0 of RRU #0 to cell #1 of RRU #0 and is allowed to maintain connection via RRU #0. In this case, the UE may recognize that the UE need not receive common information in a BBU unit and RRU unit, and is allowed to reuse common information in the BBU unit and RRU unit of the previous cell given before movement.

After receiving carrier specific information, the specific UE may define order of reception for common information in a carrier unit, common information in an RRU unit, and common information in a BBU unit, and this information may be reflected when an SIB is configured. Alternatively, regardless of common information in the BBU unit, RRU unit and carrier unit, and carrier specific information, the UE may configure SIBs in order of information needed for the UE to be connected to a cell, and receive information in this order according to content of information. Preferably, all UEs are allowed to read content including information about scheduling of other SIBs mentioned above and common information before reading other SIBs.

In LTE Rel-10/11, a UE may read SystemInfoValue Tag transmitted in SIB 1 and check whether the stored SIB information is valid. Alternatively, the UE may receive systemInfoModification transmitted in a paging message and check whether SIB information is valid. However, in this case, even if a specific SIB changes, the UE may need to receive not only information about a specific SIB but also information about all the other SIBs again.

When the BBU, RRU and carrier specific SIBs are distinguished from each other as in the embodiments described above, SystemInfoValue Tag or systemInfoModification may also be configured to be classified into BBU, RRU or carrier specific SIB and transmitted. In this case, the UE may receive a changed SIB and update the SIB information, assuming that information about unchanged SIBs is valid. For example, SystemInfoValue Tag may be classified into {SystemInfoValue Tag_RRU, SystemInfoValue Tag_RRU, SystemInfoValue Tag_carrier} and transmitted. Alternatively, systemInfoModification may also be transmitted as {systemInfoModification_BBU, systemInfoModification_RRU, systemInfoModification_carrier}.

Upon receiving information indicating whether or not SIBs in the BBU, RRU and carrier units are changed, the UE may receive SIB information indicating that SystemInfoValue Tag has changed and SIB information indicating that systemInfoModification has changed.

As an example, if the value of SystemInfoValue Tag_RRU is changed in {SystemInfoValue Tag_RRU, SystemInfoValue Tag_RRU, SystemInfoValue Tag_carrier}, the UE may receive this information and the aforementioned scheduling information about SIBs and thus receive RRU specific SIB information, assuming that RRU specific SIB information has been changed.

As another example, if the value of systemInfoModification_carrier is changed in {systemInfoModification_BBU, systemInfoModification_RRU, systemInfoModification_carrier}, the UE may receive this information and the aforementioned scheduling information about SIBs and thus receive carrier specific SIB information, assuming that carrier specific SIB information has been changed.

In the case where multiple BBUs transmitted receive signals via a specific carrier among the cases according to the mapping relationship between the BBU and the RRU and carriers, SIBs may be transmitted using various methods.

According to an embodiment, one BBU may transmit an SIB for multiple BBUs on a specific carrier on the assumption that the multiple BBUs can transmit different SIBs on the specific carrier. In this case, identifiers of an eNB and cell may be transmitted in cellIdentity contained in the SIB in each C-RAN SAS environment, or a method proposed above may be used. In this case, PCIDs used on the specific carrier may be identically configured.

For example, if multiple BBUs transmit and receive data using a specific carrier, the same FDD or TDD configuration may be used for the specific carrier. The multiple BBUs may use this information in common.

According to another embodiment, multiple BBUs may use different SIBs on a specific carrier. Each of the multiple BBUs may perform SIB transmission therefor, or one BBU may perform the procedure of coordination with multiple BBUs, transmit SIB information about the multiple BBUs. In this case, identifiers of an eNB and cell may be transmitted through the SIB in each C-RAN SAS environment (using the method proposed above), and PCIDs used on the specific carrier may be identically configured.

For example, if multiple BBUs transmit and receive signals using a specific carrier, a different PRACH configuration (including resources and a preamble) may be established for each of the BBUs. To announce this information, the method proposed above may be used.

In addition, a combination of the two methods described above may be used depending on SIB information.

A UE may perform HO to a specific carrier (cell or RRU) on which multiple BBUs perform transmission and reception or perform initial access. In this case, the UE may need to know a BBU which supports the UE. To this end, the UE may use various methods.

When a UE Performs HO

When a UE receives SIB information transmitted according to the aforementioned method, the UE may recognize that multiple BBUs transmit and receive signals via a specific carrier (cell or RRU). If an HO event is triggered when the UE performs measurement reporting about the specific carrier (cell or RRU) and transmits a measurement report for HO to multiple BBUs or a specific BBU of the multiple BBUs via an RRU, the UE may determine a BBU to which the UE desires to perform HO among multiple BBUs and report information about the determined BBU. Alternatively, when the UE transmits a measurement report indicating that an HO event has been triggered, the UE may transmit the multiple BBUs and identifiers of an eNB and cell in each C-RAN SAS environment indicating association between the multiple BBU and an RRU, and determine a BBU to which HO of the UE is to be performed among the multiple BBUs in a network (source BBU, MME, etc.).

When a UE Performs Initial Access

The UE may perform initial access according to a pre-defined method (For example, the UE may receive an SIB of a cell (carrier, RRU, or the like) having the greatest signal strength. In this case, if the SIB is configured according to the aforementioned method, the UE may recognize that multiple BBUs transmitter and receive signals via a specific carrier (cell or RRU).

In order to perform initial access, the UE may transmit a random access preamble, and determine a BBU supporting the UE by, for example, pre-defining the BBU for initial access or causing BBUs receiving the aforementioned information to perform the procedure of coordination therebetween.

To announce the BBU determined in the network to the UE, identifiers of an eNB and cell may be transmitted in a C-RAN SAS environment which allows the determined BBU to be transmitted in a random access response or RRC connection complete message, which is used in the random access procedure. Upon receiving the message, the UE may recognize the BBU that supports the UE.

In addition, the UE may select a specific BBU from among multiple BBUs and receive SIB information for the selected BBU. Then, the UE may perform the procedure of random access to the determined BBU. When the UE desires to perform initial access on a specific carrier, the UE may determine to access a specific BBU among multiple BBUs. In this case, the UE may receive an SIB corresponding to a specific BBU and transmit a random access preamble to the determined BBU to perform initial access.

In this case, different RACH configurations (resources, preambles, and the like) may be established for multiple BBUs, and thus the BBUs receiving the configurations may recognize a BBU by which the UE has determined to be supported.

Hereinafter, configuration of an apparatus for implementation of the embodiments described above will be described.

Figure 13:
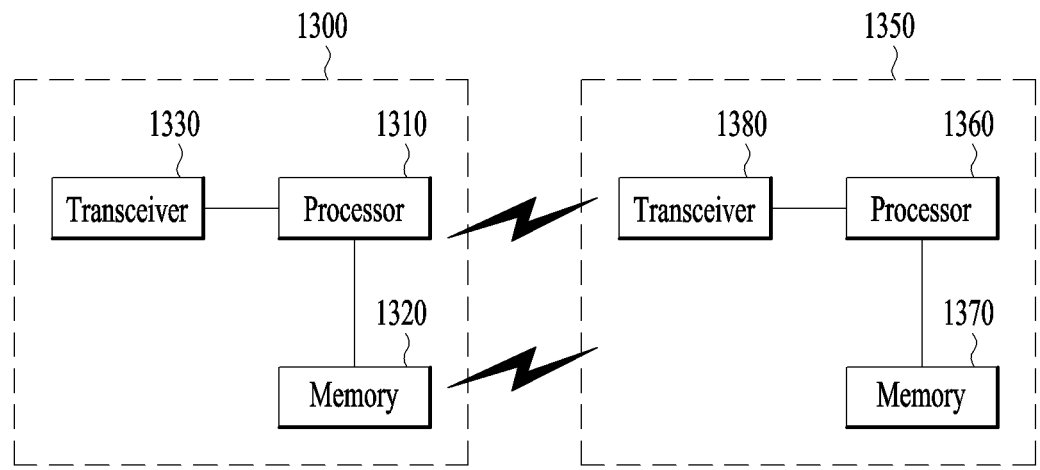
FIG. 13 is a block diagram illustrating a radio apparatus according to an embodiment of the present invention.

FIG. 13 is a block diagram illustrating a radio apparatus according to an embodiment of the present invention.

In FIG. 13, a radio apparatus 1300 may be a UE, and a radio apparatus 1350 may be an apparatus of a network terminal. Specifically, the radio apparatus 1350 may include a BBU and an RRU. The radio apparatus of 1350 may be a macro eNB, a small cell eNB, or the like.

The UE 1300 may include a processor 1310, a memory 1320 and a transceiver 1330. The network apparatus 1350 may include a processor 1360, a memory 1370 and a transceiver 1380. The transceivers 1330 and 1380 may transmit/receive radio signals and be implemented in a physical layer of, for example, 3GPP/IEEE 802. The processors 1310 and 1360 may be implemented in the physical layer and/or MAC layer and connected to the transceivers 1330 and 1380. The processors 1310 and 1360 may execute the procedure of transmission and reception of the aforementioned system information.

The processors 1310 and 1360 and/or the transceivers 1330 and 1380 may include an application-specific integrated circuit (ASIC), another chip set, a logic circuit and/or a data processor. The memories 1320 and 1370 may include a ROM (read-only memory), RAM (random access memory), flash memory, a memory card, a storage medium and/or other storage units. When an embodiment is implemented by software, a method described above may be executed as a module (e.g., a processor, function) for performing the functions described above. The module may be stored in the memories 1320 and 1370, and executed by the processors 1310 and 1360. The memories 1320 and 1370 may be disposed inside or outside the processors 1310 and 1360, and be connected to the processors 1310 and 1360 by a well-known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention disclosed in the appended claims. Thus, the present invention is not intended to be limited to the embodiments described herein, but is intended to accord with the widest scope corresponding to the principles and novel features disclosed herein.

INDUSTRIAL APPLICABILITY

Although embodiments of the present invention have been described above focusing on the 3GPP-based 5G mobile communication system, they are applicable to various mobile communication systems. Embodiments may be used for a system which needs to acquire system information in a wireless network environment where heterogeneous networks coexist.

The invention claimed is:

1. A method for receiving system information by a terminal in a cloud wireless communication system comprising at least one baseband unit (BBU) and at least one remote radio unit (RRU) connected to a specific BBU of the at least one BBU to directly provide a service for the terminal via at least one cell, the method comprising:
receiving an identifier from a network,
wherein the identifier allows the terminal to recognize whether a BBU, an RRU and a cell are changed through the identifier;
checking whether at least one of the BBU, the RRU and the cell is changed through the received identifier; and
selectively receiving, from the network, only system information necessary for change of one of the BBU, the RRU and the cell,
wherein the system information is divided into BBU specific information, RRU specific information, and cell specific information, and
wherein the only system information necessary for the change of one of the BBU, the RRU and the cell is determined based on a relation among the BBU, the RRU and the cell of the cloud wireless communication system.

2. The method according to claim 1, wherein the terminal moves from a source cell to a target cell, and
wherein the network provides a service for the target cell.

3. The method according to claim 1, wherein the terminal performs cell selection or reselection, and
wherein the network provides a service for a cell selected or reselected by the terminal.

4. The method according to claim 1, wherein the system information is divided into the BBU specific information, the RRU specific information, and the cell specific information according to types of system information transmission blocks.

5. The method according to claim 1, wherein the identifier comprises at least one of a virtual BBU pool identifier, a BBU identifier and an RRU identifier.

6. The method according to claim 1, further comprising:
receiving system information scheduling information from the network,
wherein the selective receiving is performed according to the received system information scheduling information.

7. The method according to claim 6, wherein the system information scheduling information contains an identifier indicating a BBU group, an RRU group and a carrier group to which a specific system information block is to be applied.

8. The method according to claim 7, wherein the system information scheduling information further contains a unit field indicating whether the specific system information block includes BBU common information, RRU common information, or carrier common information.

9. A method for transmitting system information to a terminal in a cloud wireless communication system comprising at least one baseband unit (BBU) and at least one remote radio unit (RRU) connected to a specific BBU of the at least one BBU to directly provide a service for the terminal via at least one cell, the method comprising:
transmitting an identifier from a network to the terminal,
wherein the identifier allows the terminal to recognize whether a BBU, an RRU and a cell is changed through the identifier; and
distinguishing and transmitting, from the network, only system information necessary for change of one of the BBU, the RRU and the cell,
wherein the system information is divided into BBU specific information, RRU specific information, and cell specific information, and
wherein the only system information necessary for the change of one of the BBU, the RRU and the cell is determined based on a relation among the BBU, the RRU and the cell of the cloud wireless communication system.

10. A terminal operating in a cloud wireless communication system comprising at least one baseband unit (BBU) and at least one remote radio unit (RRU) connected to a specific BBU of the at least one BBU to directly provide a service for the terminal via at least one cell, the terminal comprising:
a receiver configured to receiver, from a network, an identifier,
wherein the identifier allows the terminal to recognize whether a BBU, an RRU and a cell are changed; and
a processor connected to the receiver,
wherein the processor is configured to:
check whether at least one of the BBU, the RRU and the cell is changed through the received identifier, and
control the receiver to selectively receive, from the network, only system information necessary for change of one of the BBU, the RRU and the cell,
wherein the system information is divided into BBU specific information, RRU specific information, and cell specific information, and
wherein the only system information necessary for the change of one of the BBU, the RRU and the cell is determined based on a relation among the BBU, the RRU and the cell of the cloud wireless communication system.

11. A network apparatus operating in a cloud wireless communication system comprising at least one baseband unit (BBU) and at least one remote radio unit (RRU) connected to a specific BBU of the at least one BBU to directly provide a service for a terminal via at least one cell, the network apparatus comprising:
a transmitter configured to transmit, to the terminal, an identifier,
wherein the identifier allows the terminal to recognize whether a BBU, an RRU and a cell is changed; and
a processor connected to the transmitter,
wherein the processor is configured to:
control the transmitter to distinguish and transmit only system information necessary for change of one of the BBU, the RRU and the cell,
wherein the system information is divided into BBU specific information, RRU specific information, and cell specific information, and
wherein the only system information necessary for the change of one of the BBU, the RRU and the cell is determined based on a relation among the BBU, the RRU and the cell of the cloud wireless communication system.

* * * * *